(12) United States Patent
Zimmermann

(10) Patent No.: US 7,938,144 B2
(45) Date of Patent: May 10, 2011

(54) REFUELING VALVE FOR A FUEL STORAGE SYSTEM AND METHOD THEREFOR

(75) Inventor: Joerg Zimmermann, Vancouver (CA)

(73) Assignee: Adobe Systems Incorporated, San Jose, CA (US)

( * ) Notice: Subject to any disclaimer, the term of this patent is extended or adjusted under 35 U.S.C. 154(b) by 1117 days.

(21) Appl. No.: 11/621,542

(22) Filed: Jan. 9, 2007

(65) Prior Publication Data

US 2010/0258214 A1    Oct. 14, 2010

Related U.S. Application Data

(60) Provisional application No. 60/757,756, filed on Jan. 9, 2006.

(51) Int. Cl.
*F16K 15/14* (2006.01)

(52) U.S. Cl. ............. 137/843; 141/2; 141/386; 141/347

(58) Field of Classification Search .................. 141/2, 5, 141/18, 286, 311 R, 347, 348, 349; 137/843; 99/467

See application file for complete search history.

(56) References Cited

U.S. PATENT DOCUMENTS

| | | | | |
|---|---|---|---|---|
| 2,675,205 A * | 4/1954 | Fortin | ............. | 251/121 |
| 3,595,467 A * | 7/1971 | Goglio | ............. | 383/103 |
| 4,031,915 A * | 6/1977 | McElhoe et al. | ............. | 137/529 |
| 4,415,003 A | 11/1983 | Paradis et al. | | |
| 6,668,862 B2 * | 12/2003 | Maezawa et al. | ............. | 137/843 |
| 7,128,106 B2 * | 10/2006 | Becerra et al. | ............. | 141/349 |
| 7,537,024 B2 * | 5/2009 | Adams et al. | ............. | 137/614.04 |
| 2002/0153048 A1 * | 10/2002 | Maezawa et al. | ............. | 137/843 |
| 2004/0209142 A1 * | 10/2004 | Becerra et al. | ............. | 429/34 |
| 2008/0169444 A1 * | 7/2008 | Guala | ............. | 251/331 |

* cited by examiner

*Primary Examiner* — Timothy L Maust
*Assistant Examiner* — Jason K Niesz
(74) *Attorney, Agent, or Firm* — Schwegman Lundberg & Woessner, P.A.

(57) ABSTRACT

A refueling valve assembly is a pressure-activated valve that allows a flow of fluid, for example, fluid fuel, into the fuel reservoir. A fuel inlet port allows for the fluid fuel to be introduced into the valve assembly. The valve assembly includes a compressible member having a first sealing position and a second fueling position, where the compressible member is more compressed in the second fueling position than the first sealing position. The compressible member is sealingly coupled with the fuel inlet port when the compressible member is in the first sealing position.

23 Claims, 6 Drawing Sheets

REFUELING VALVE FOR A FUEL STORAGE SYSTEM AND METHOD THEREFOR

PRIORITY OF INVENTION

This non-provisional application claims the benefit of priority under 35 U.S.C. §119 (e) to U.S. Provisional Patent Application Ser. No. 60/757,756, filed Jan. 9, 2006, which is herein incorporated by reference.

TECHNICAL FIELD

Fuel storage systems, and more particularly, a refueling valve for a fuel storage system.

TECHNICAL BACKGROUND

An overall trend for electronic components, and their power supplies, is to become smaller and smaller, but yet more and more powerful. However, making a power supply or an energy source, such as a fuel cell, more powerful competes with making the energy source smaller.

In an example, for fuel cell systems used with electronic components, for example, portable electronic components, every aspect of the system must be made as small as possible, and yet continue to maximize the energy provided to the electronic component. Therefore, there is a need for a fuel storage system, and its respective refueling valve, with minimum size requirements.

SUMMARY

A refueling valve assembly is a pressure activated valve that allows a flow of fluid, for example, fluid fuel, into a fuel reservoir. A fuel inlet port allows for the fluid fuel to be introduced into the valve assembly. The valve assembly includes a compressible member having a first sealing position and a second fueling position, where the compressible member is more compressed in the second fueling position than the first sealing position. The compressible member is sealingly coupled with the fuel inlet port when the compressible member is in the first sealing position.

A method is further provided which includes introducing fuel into a fuel inlet port, compressing a compressible member away from a fuel inlet port with fluidic pressure from the fuel, and flowing fuel around the compressible member, and into a fuel reservoir. Further variations are described in greater detail herein.

These and other embodiments, aspects, advantages, and features will be set forth in part in the description which follows, and in part will become apparent to those skilled in the art by reference to the following description and referenced drawings or by practice thereof. The aspects, advantages, and features are realized and attained by means of the instrumentalities, procedures, and combinations particularly pointed out in the appended claims and their equivalents.

DESCRIPTION OF THE EMBODIMENTS

Figure 1:
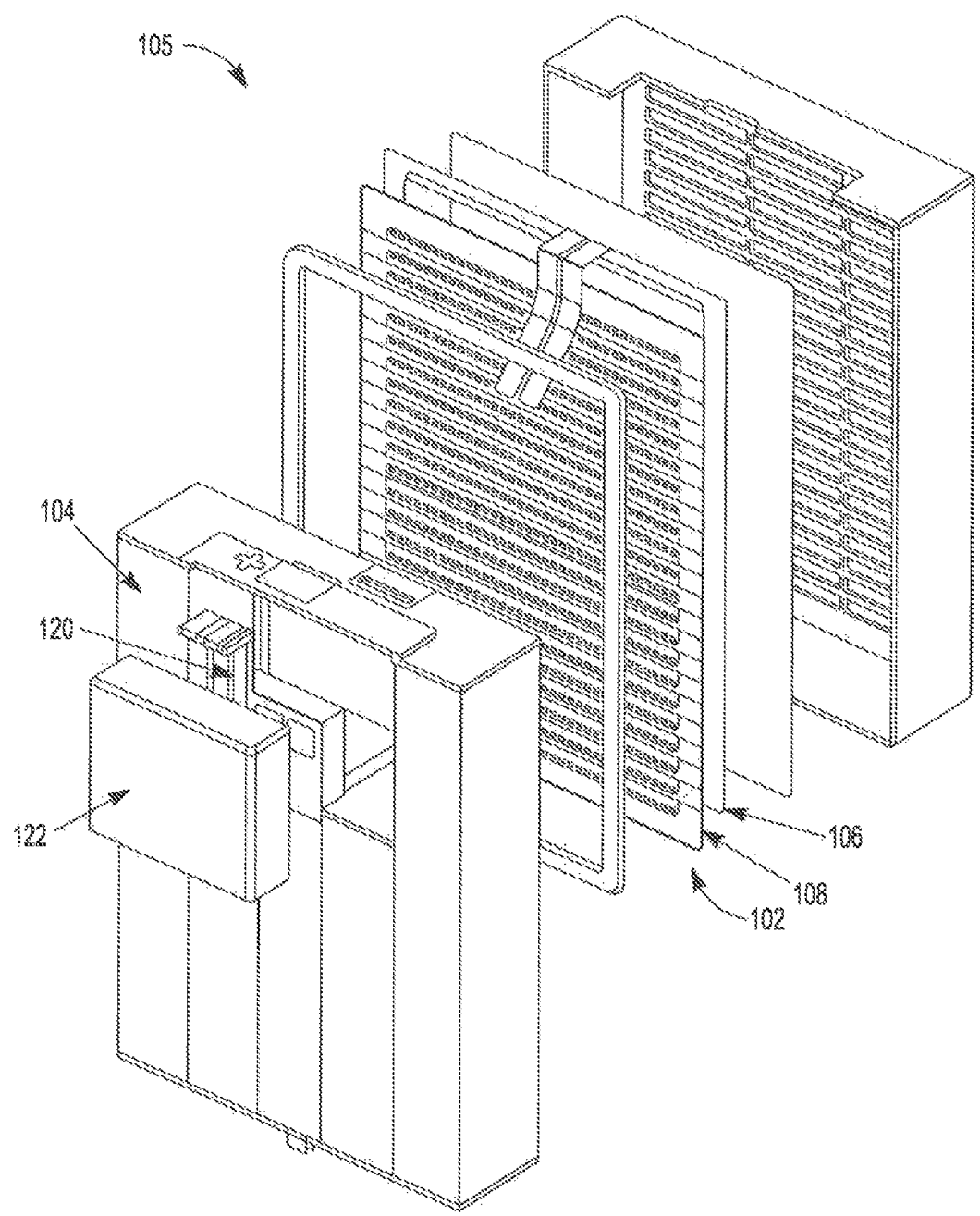
FIG. 1 is an exploded perspective view of a fuel cell system constructed in accordance with at least one embodiment.

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope is defined by the appended claims. FIG. 1 illustrates a fuel cell system 105 of the type, for example, discussed in Mclean et al., U.S. patent application Ser. No. 11/621,533, entitled "PORTABLE FUEL CELL SYSTEMS AND METHODS THEREFOR," filed even date herewith, the disclosure of which is incorporated herein by reference in its entirety. The fuel cell system 105 includes, among other things, at least one fuel cell layer 102 and a fuel containment unit 104. The at least one fuel cell layer 102 includes one or more fuel cells each including an anode, a cathode 108, and a (e.g., polymer ion) exchange membrane interposed therebetween. The at least one fuel cell layer 102 utilized in system 105 may be a planar fuel cell, for example, the fuel cell layer discussed in commonly owned U.S. patent application Ser. No. 11/047,560, entitled "ELECTROCHEMICAL CELLS HAVING CURRENT-CARRYING STRUCTURES UNDERLYING ELECTROCHEMICAL REACTION LAYERS," the disclosure of which is incorporated herein by reference in its entirety.

In an example of the fuel cell system 105, the cathode 108 of each cell is supplied with an air containing oxygen as an oxidizing agent, and the anode of each cell is supplied with a fuel, such as hydrogen, supplied from fuel containment unit 104 to the anode of fuel cell layer 102 via a regulator outlet of a pressure regulator 110. In one example, the pressure regulator is integrally mounted into a wall of the reservoir. Among other things, this integrated pressure regulator may comprise one or more of a regulator body including a regulator cavity therein, a resilient member, a diaphragm, a regulator valve, or a seal member. The diaphragm effectively separates the regulator cavity into a first chamber housing the resilient member and a second chamber connecting a regulator inlet and a regulator outlet. The regulator valve includes a valve inlet connected to a valve outlet via an internal flow passageway. A portion of the regulator valve is coupled with the diaphragm such that the two components move in concert. The seal member may be disposed between an outer surface of the regulator valve and the regulator body in effect separating the second chamber into a primary pressure plenum and a secondary pressure plenum. The diaphragm and the regulator valve are movingly responsive to a pressure difference between a first chamber pressure and a second chamber pressure.

The fuel containment unit 104 includes, in an option, a cellular fuel reservoir as discussed in Zimmermann, U.S.

patent application Ser. No. 11/621,501, entitled "CELLULAR RESERVOIR AND METHODS RELATED THERETO," filed even date herewith, the disclosure of which is incorporated herein by reference in its entirety. In an example, the fuel containment unit 104 encloses a fuel, such as hydrogen, or a fuel storage material, such as a metal hydride. In one example, fuel containment unit 104 comprises a void to house optional components such as a battery 122 or an electronic conditioning circuit 120.

Power from the fuel cell layers 102 may be utilized by a current collecting circuit 106, which collects the power generated by the fuel cell 102 and routes it out of the system 105 or alternatively into a conditioning electronics section (e.g., an electronic conditioning circuit) via a power output connector. The current collecting circuit 106 may be flexible to conform to fuel cell layers 102 shape or location. In one example, the fuel cell system 105 provides a peak power output of up to about 4 watts. In some embodiments, the fuel cell system 105 may provide a peak power output of about 2-3 Watts. The average power output of the fuel cell system may be between about 0.2-1.8 Watts, about 0.5-1.5 Watts, about 0.75-1.25 Watts or about 1 Watt. In another example, fuel cell system 105 provides an energy density of about 200-400 Watt-hr/L, 250-350 Watt-hr/L or about 300 Watt-hr/L in about a 10 or a 25 cubic centimeter form factor.

The fuel cell system 105 is suitable for use with a portable electronic component. Some examples of portable electronics for use with the fuel cell include, but are not limited to, cellular phones, satellite phones, laptop computers, computer accessories, displays, personal audio and/or video players, medical devices, televisions, transmitters, receivers, lighting devices including outdoor lighting or flashlights, electronic toys, or any device conventionally used with batteries. The fuel cell operates through use of fuel that is contained within a fuel reservoir. As the fuel in the fuel reservoir is consumed, refueling of the fuel reservoir must occur for continued use of the component. In order to introduce additional fuel into the fuel cell reservoir, a refueling valve assembly 100 is provided.

The refueling valve assembly 100 is a pressure activated one-way valve that allows a flow of fluid, for example, fluid fuel, into the fuel reservoir for a fuel storage system. The flow of fuel is allowed into the fuel reservoir during refueling, but does not allow fuel to flow back out of the fuel reservoir. In an option, flow of fuel is permitted to flow back out of the fuel reservoir if the fueling reservoir is over pressurized with fuel.

Figure 2:
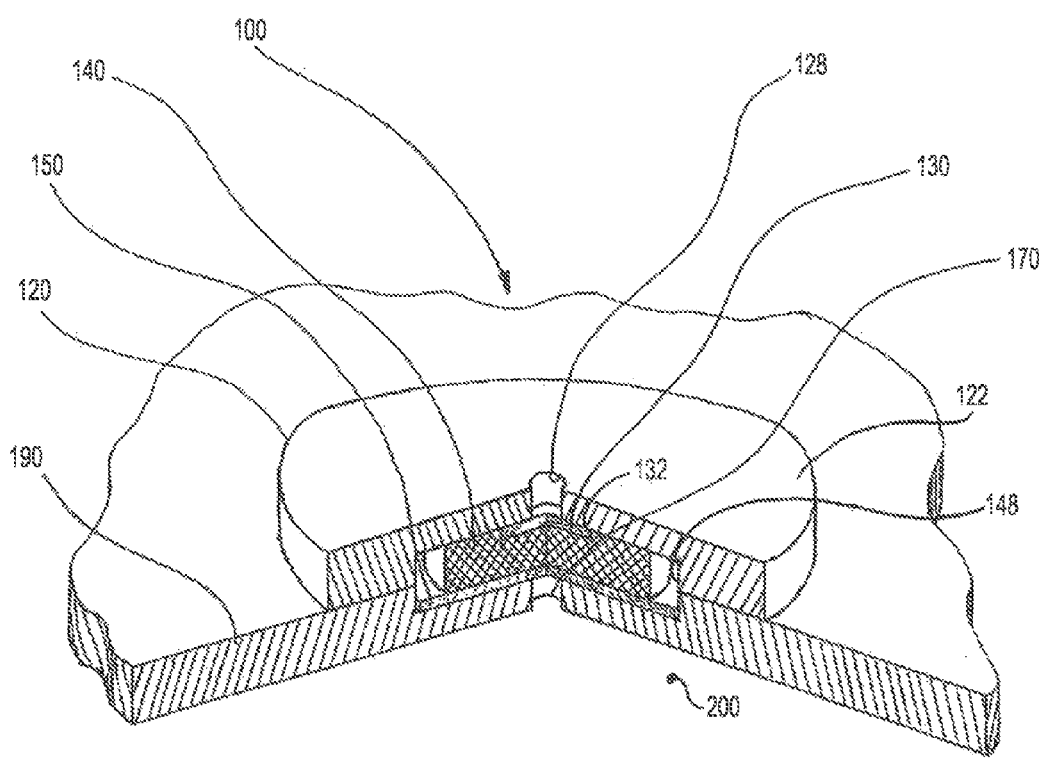
FIG. 2 is a cut-away perspective view illustrating a portion of a fuel storage system constructed in accordance with at least one embodiment.
Figure 3:
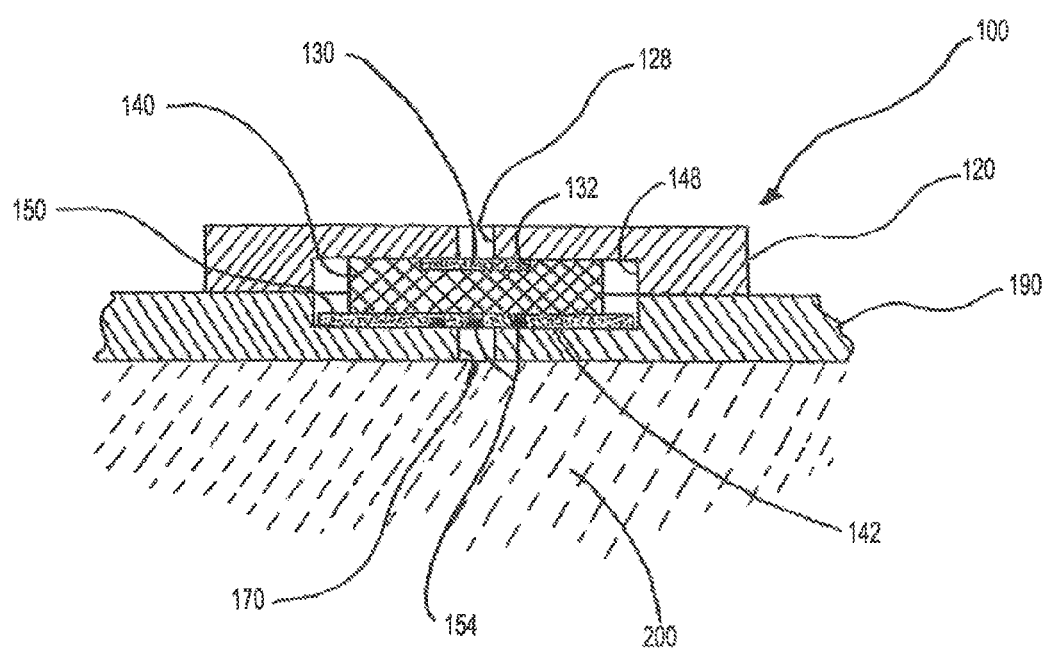
FIG. 3 is a cross-sectional view of a portion of a fuel storage system in a sealing state constructed in accordance with at least one embodiment.

One example of a refueling valve assembly 100 is illustrated in FIGS. 2 and 3. In an embodiment, the refueling valve assembly 100 includes an outside cover 120, a fuel inlet port 128, an optional filter 130, a compressible member 140, a fuel diffusion member 150, an optional fuel outlet port 170, an inside cover 190, and an optional fuel reservoir 200.

The outside cover 120 of the refueling valve assembly 100 is an optional separate component, or can be integrated with a portion of another component, such as a fuel cell system or can be separate fuel reservoir for a component, such as, but not limited to, a fuel cell. The outside cover 120 is sufficiently rigid to support the pressure within the valve assembly 100. The outside cover 120, in one example, is a circular disc 122 having an example diameter of about 5 mm. It should be noted that other shapes and/or sizes can be incorporated with the outside cover 120 in addition to those described herein. Suitable materials for the outside cover 120 include, but are not limited to, steel, stainless steel, plastic, composite material, brass, or aluminum. Within the outside cover 120 is a fuel inlet port 128, through which fuel is introduced.

As mentioned above, the refueling valve assembly 100 optionally includes a filter 130. The filter 130 assists in preventing particulate contamination of the refueling valve assembly 100 or other fuel system components, including, but not limited to, the fuel reservoir 200. Further, the filter 130, while trapping particles therein, does not substantially impede the flow of fuel therethrough. Suitable materials for the filter include, but are not limited to expanded plastic, filter paper, felt, porous metal, metal screen, or plastic screen. In an option, the filter 130 is placed external to the outside cover 120. In another option, the filter 130 is fastened to a portion of the refueling valve assembly 100, such as an outside cover 120. In yet another option, the filter is placed within port 128. Suitable fastening techniques include, but are not limited to, adhesives, fasteners, friction fit, interference fit, and the like. In yet another option, the filter 130 is disposed within a filter recess 132 of the outside cover 120 or a wall of the fuel cell or fuel reservoir 200, or the compressible member 140.

The compressible member 140 is disposed within at least a portion of the refueling valve assembly 100. For example, the compressible member 140 is disposed within a chamber 148, and in an option, abuts the outside cover 120. The chamber 148 forms an opening for the compressible member 140, and can vary in size. For example, in an option, the chamber 148 is greater than in at least one dimension than the compressible member 140. In another option, a portion of the chamber 148 is lesser than at least one dimension of the compressible member 140. In another option, the compressible member 140 is disposed between the outside cover 120 and the inside cover 190.

The compressible member 140 is compressible between a sealed position and an unsealed position relative to the fuel inlet port 128. In the sealed position, the compressible member 140 is generally uncompressed, for example, by a fueling fixture. It is possible, however, for the compressible member 140 to be under some compression within the inside and outside covers 190, 120, and/or fuel pressure from the reservoir may also compress the compressible member 140. In the unsealed position, the compressible member 140 is compressed to a second fueling position, where fuel is permitted to enter through the inlet port 128.

The compressible member, in an option, is formed of a compressible material, for example, elastomeric material. Suitable materials for the compressible member 140 include, but are not limited to, silicone elastomer, natural rubber, latex, nitrile, Ethylene Propylene Diene Monomer (EPDM), and VITON ® fluoroelastomer. The compressible member 140 is compressible or collapsible such that the overall height, or thickness, and/or volume of the compressible member 140 are smaller in the second compressed position than in the first uncompressed position. Having the compressible member 140 compress or collapse allows for a savings in overall volume for the device. In another option, the compressible member 140, and the optional filter can be designed to rupture or extrude through the fuel inlet port 128 if the pressure in the fuel reservoir is higher than a predetermined amount.

The compressible member 140, in an uncompressed disposition, seals the fuel inlet port 128, for example by sealing against the outside cover 120 surrounding the fuel inlet port 128. The seal can be assisted by internal pressure from the fuel reservoir 200. The refueling valve assembly 100 further optionally includes one or more features that prevent the compressible member 140 from sealing against the inside cover 190 during a refueling procedure. One example of such a feature is a fuel diffusion member 150. The fuel diffusion member 150 is disposed between the compressible member 140 and the fuel outlet port 170, and can be a discrete member, or can be formed on an inside cover 190 or the compressible member 140. The inside cover 190 is sufficiently rigid to support the pressure within the valve assembly 100. Suitable materials for the inside cover 190 include, but are not limited to, steel, stainless steel, plastic, composite material, brass, or aluminum.

In another option, the embodiment does not necessarily include the diffusion member 150. The outlet port 170 is formed on at least a portion of the compressible member 140. For example, the outlet port 170 is non-coaxial with the inlet port 128. In another example, the outlet port 170 is normal to the inlet port 128. During use, the fluid enters through the inlet port 128. Pressure of the fluid depresses the compressible member 140, and allows the fluid to flow over the compressible member 140. The fuel, such as fuel fluid, enters the volume in the chamber 148 surrounding the compressible member 140. The outlet port 170 is disposed in part on a portion of the chamber 148, such as a wall of the chamber 148, and the outlet port 170 is unobstructed by the compressible member 140 when the compressible member 140 is depressed.

The fuel diffusion member 150 allows for fuel to pass under the compressible member 140 and into the fuel outlet port 170, for instance, by allowing for fluid communication between a chamber surrounding the compressible member 140 and the fuel outlet port 170. The fuel diffusion member 150 further provides support, for example, rigid support, for the back of the compressible member 140 as the compressible member 140 is compressed to introduce fuel, while not substantially impeding the flow of fuel. For example, the fuel diffusion member 150 can include porous plastic, porous metal, porous ceramic, microporous expanded polytetrafluoroethylene (EPTFE), expanded, filter paper, felt, porous metal, metal screen, plastic screen, or grooved metal.

In another option, the fuel diffusion member 150 is more rigid than the compressible member 140. In yet another option, the fuel diffusion member 150 includes a deviation in a surface 142 (FIG. 2) between the fuel diffusion member 150 and the fuel outlet port 170. For example, the fuel diffusion member 150 includes one or more grooves 154, for example, macroscopic grooves, as illustrated in FIG. 2. In an example, the grooves extend from at least one side portion of the fuel diffusion member to the fuel outlet port or otherwise allow fluid communication with the fuel outlet port 170. The grooves are formed, for example, by machining, etching, or molding processes.

In another option, deviations can be formed in one or more of fuel diffusion member 150, the compressible member 140, the inside cover, or a combination thereof. In yet another option, one or more projections can be formed on the compressible member or the fuel diffusion member. Suitable material for such a fuel diffusion member includes, but is not limited to metal, plastic, composite, ceramic, glass, or a material that can support the compressed load of the compressible member. Further options include providing deviations along the compressible member, or providing separate components or coatings to the other components to achieve the fluid communication with the fuel outlet port 170.

The fuel outlet port 170 is in fluid communication with the fluid reservoir 200, where fuel is stored for use by, for example, the fuel cell. In an option, the fluid outlet port 170 is integral with a wall of the fuel reservoir 200. In another option, the fuel outlet port 170 is disposed within an inside cover 190, which is adjacent to a fuel reservoir 200. The inside cover 190, in an option, is coupled directly with the outside cover 120. Examples of ways in which to attach the inside cover with the outside cover include, but are not limited to, gluing, bolting, welding, brazing, or soldering, fixation members such as screws, nails, interference fit, snap fit and the like, or leak tight interconnections.

Figure 5:
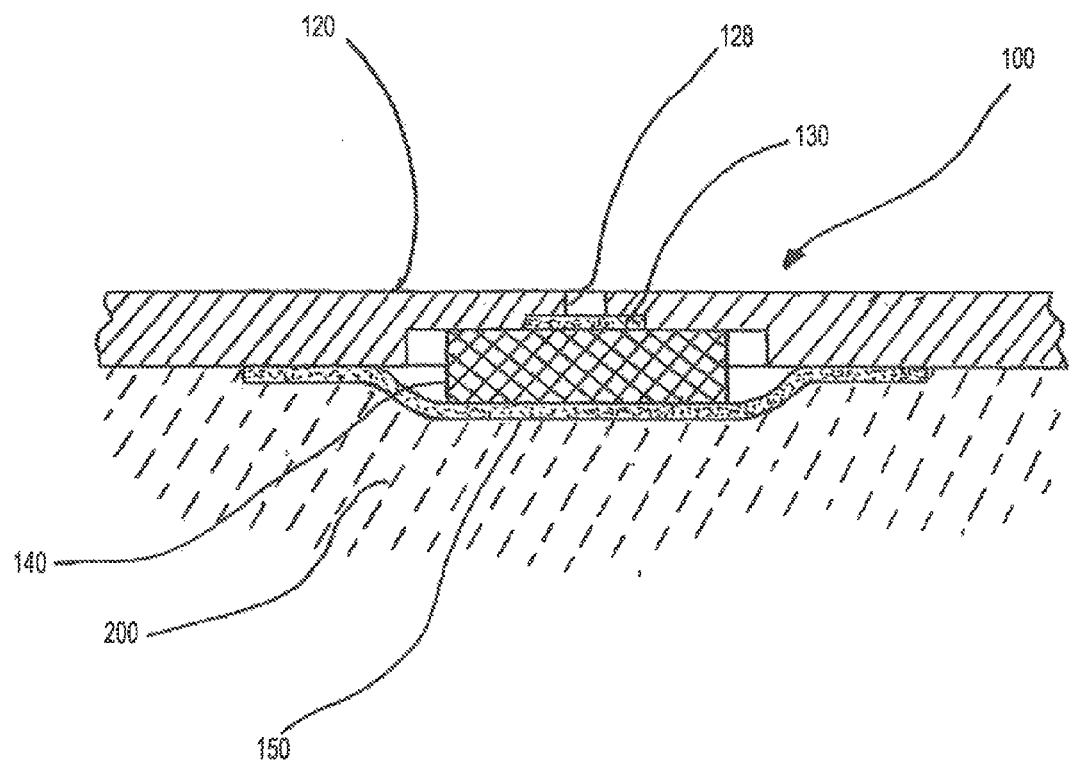
FIG. 5 is a cross-sectional view of a portion of a fuel storage system in a sealing state constructed in accordance with at least one embodiment.

FIG. 5 illustrates another example of a refueling valve assembly 100, which has some similarity to that which is discussed above. However a member, such as a porous member, replaces one or more, or all of: the inside cover, and the outlet port (discussed above). In an option, the member is a fuel diffusion member 150 that is fixated or adhered to the outside cover 120. For example, the fuel diffusion member 150 can be fixed directly to the outside cover 120 by bonding with adhesive, fixation members, melting, or welding. The outside cover 120 further forms a portion of the fuel reservoir 200, for example, by providing at least a portion of a wall for the fuel reservoir 200. This further allows for volumetric savings for the overall design.

The compressible member 140, which includes, but is not limited to the variations discussed above, is disposed between the outside cover 120 and the fuel diffusion member 150. The compressible member 140 provides a seal for the fuel inlet port 128. The fuel diffusion member 150 provides a rigid support for the compressible member 140 when the compressible member 140 is compressed during the refueling process. An optional filter is associated with the fluid inlet port 128, which assists in preventing contamination to the refueling valve assembly 100, its components, or the fuel therein.

Figure 4:
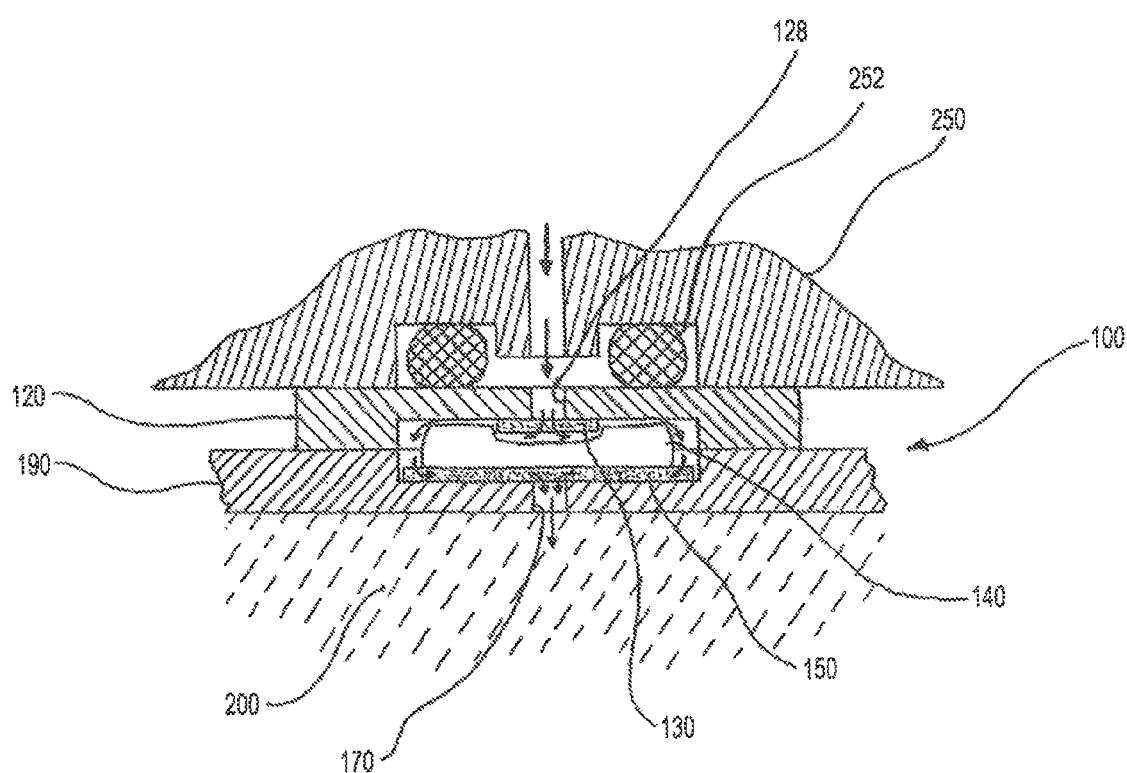
FIG. 4 is a cross-sectional view of a portion of a fuel storage system and a refueling fixture in a refueling state constructed in accordance with at least one embodiment.
Figure 6:
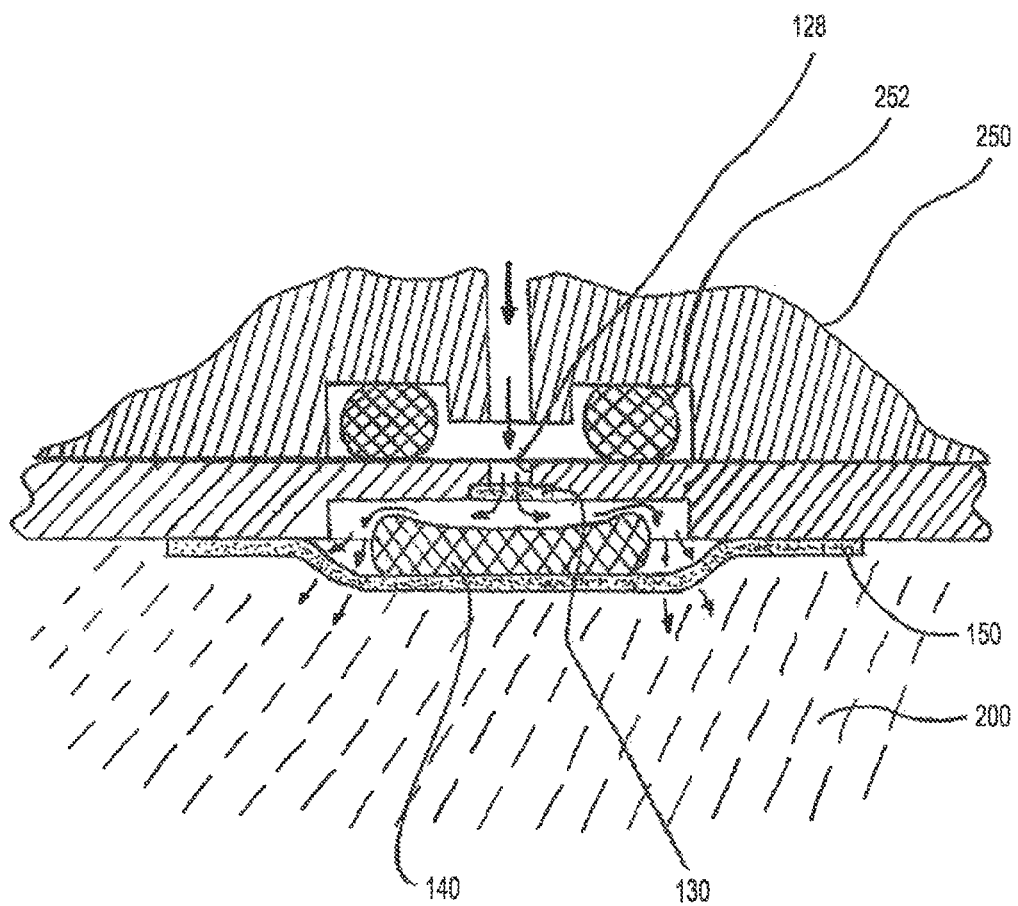
FIG. 6 is a cross-sectional view of a portion of a fuel storage system and a refueling fixture in a refueling state constructed in accordance with at least one embodiment.

Examples of the refueling process can be seen in FIGS. 4 and 6. A refueling fixture 250 is directed toward the refueling valve assembly 100. In an option, the refueling fixture 250 forms a seal against a portion of the refueling valve assembly 100, for example, around the inlet port 128 with a seal 252, such as an o-ring or gasket. Fuel is introduced into the refueling valve assembly 100, and the fluidic pressure of the fuel compresses the compressible member 140, for example, as shown in FIGS. 4 and 6, and breaks the seal between the compressible member 140 and the outside cover 120. In another option, an environment surrounding the exterior of the outside cover 120 may be pressurized with fuel to force fuel through the refueling valve assembly 100 and into the fuel reservoir 200.

The fuel flows around the compressible member 140 as shown by the arrows, and into the fuel reservoir 200. In an option, the fuel flows through the inlet port 128, through an optional filter around the compressible member 140 and, through the fuel diffusion member 150, for example as shown in FIG. 6. In another option, when the fuel is flowing into the reservoir 200, the fuel is flowing through deviations between the compressible member 140 and the fluid diffusion member 150. For example, the fuel flows through grooves.

When the fueling process is complete, the refueling fixture 250 is removed from the valve assembly 100, and the valve becomes closed. For example, the compressible member decompresses, and fluidic pressure from the fuel reservoir through the fuel outlet port exerts pressure on to the compressible member and presses the compressible member against the outside cover. The decompression of the compressible member and/or the fluid pressure from the reservoir creates a seal between the compressible member and the outside cover such that fuel does not flow past the compressible member and into the fuel inlet port. In another option, the compressible member 140 and/or the fluid diffusion member 150 can be designed to intentionally fail if the pressure in the fuel reservoir 200 becomes too great, or greater than a predetermine amount.

Advantageously, the refueling valve assembly allows for the volumetric space of the fuel reservoir to be optimized, while the overall volume of the fuel system is minimized, resulting in a simple and compact refueling valve for a fuel cell device.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A fuel cell refueling valve comprising:
   a fuel inlet port;
   at least one compressible member disposed adjacent to the fuel inlet port, the at least one compressible member having a first sealing position and a second fueling position, the at least one compressible member more compressed in the second fueling position than the first sealing position;
   the at least one compressible member sealingly coupled with the fuel inlet port when the at least one compressible member is in the first sealing position; and
   a fuel diffusion member disposed adjacent to the at least one compressible member; and
   a fuel reservoir in fluid communication with the fuel inlet port when the at least one compressible member is disposed in the second fueling position.

2. The fuel cell refueling valve as recited in claim 1, further comprising a porous filter disposed between the at least one compressible member and the fuel inlet port.

3. The fuel cell refueling valve as recited in claim 1, further comprising a fuel outlet port in communication with the fuel reservoir.

4. The fuel cell refueling valve as recited in claim 3, wherein the fuel outlet port is disposed within an outside cover.

5. The fuel cell refueling valve as recited in claim 3, wherein the fuel outlet port is disposed within a reservoir wall.

6. The fuel cell refueling valve as recited in claim 1, wherein the fuel inlet port is disposed within an inside cover.

7. The refueling valve as recited in claim 1, further comprising means for passing fuel under the compressible member and into the outlet port.

8. The fuel cell refueling valve as recited in claim 1, wherein the refueling valve is a component of a portable electronic device.

9. The fuel cell refueling valve as recited in claim 1, wherein the refueling valve is activated by fuel pressure.

10. The fuel cell refueling valve as recited in claim 1, wherein the at least one compressible member is formed of an elastomeric material.

11. The fuel cell refueling valve as recited in claim 1, wherein the fuel diffusion member is formed on an inside cover.

12. The fuel cell refueling valve as recited in claim 1, wherein the fuel diffusion member is formed on the compressible member.

13. A method of refueling a fuel cell, the method comprising:
    introducing a fuel into a refueling valve, the refueling valve including:
      a fuel inlet port;
      at least one compressible member disposed adjacent to the fuel inlet port, the at least one compressible member having a first sealing position and a second fueling position, the at least one compressible member more compressed in the second fueling position than the first sealing position;
      the at least one compressible member sealingly coupled with the fuel inlet port when the at least one compressible member is in the first sealing position; and
      a fuel diffusion member disposed adjacent to the at least one compressible member; and
    a fuel reservoir in fluid communication with the fuel inlet port when the at least one compressible member is disposed in the second fueling position;
    compressing the at least one compressible member away from the fuel inlet port with fluidic pressure from the fuel;
    flowing fuel around the at least one compressible member;
    flowing fuel around the fuel diffusion member; and
    flowing fuel into the fuel reservoir.

14. The method as recited in claim 13, further including coupling a refueling fixture with the fuel inlet port.

15. The method as recited in claim 13, wherein introducing fuel includes introducing fuel into a fuel cell system.

16. The method as recited in claim 13, further comprising ceasing introducing fuel into the fuel inlet port and allowing the compressible member to decompress, thereby sealing the fuel inlet port.

17. The method as recited in claim 13, wherein flowing fuel into the fuel reservoir includes flowing fuel through a fuel outlet port within a wall of the fuel reservoir.

18. The method as recited in claim 13, further comprising flowing fuel through a filter associated with the fuel inlet port.

19. The method as recited in claim 13, further comprising flowing fuel through a fuel outlet port in a chamber, and wherein the chamber has the compressible member therein.

20. The method as recited in claim 13, wherein the refueling valve is a component of a portable electronic device.

21. The method as recited in claim 13, wherein the at least one compressible member is formed of an elastomeric material.

22. The method as recited in claim 13, wherein the fuel diffusion member is formed on an inside cover.

23. The method as recited in claim 13, wherein the fuel diffusion member is formed on the compressible member.

* * * * *

UNITED STATES PATENT AND TRADEMARK OFFICE
CERTIFICATE OF CORRECTION

PATENT NO. : 7,938,144 B2  
APPLICATION NO. : 11/621542  
DATED : May 10, 2011  
INVENTOR(S) : Joerg Zimmermann Page 1 of 1

It is certified that error appears in the above-identified patent and that said Letters Patent is hereby corrected as shown below:

On the Title page, in Item (73), under "Assignee", in column 1, lines 1-2, delete "Adobe Systems Incorporated, San Jose, CA (US)" and insert -- Angstrom Power Inc., North Vancouver (CA) --, therefor.

Signed and Sealed this  
Twenty-sixth Day of July, 2011

David J. Kappos  
*Director of the United States Patent and Trademark Office*